Patented June 2, 1942

2,285,277

UNITED STATES PATENT OFFICE 2,285,277

NOBLE METAL CATALYST AND PROCESS OF PREPARING SAME

Clyde O. Henke, Wilmington, Del., Roland G. Benner, Carneys Point, N. J., and Robert C. W. Jones, Wilmington, Del., assignors to E. I. du Pont de Nemours & Company, Wilmington, Del., a corporation of Delaware No Drawing. Application November 8, 1939, Serial No. 303,475

12 Claims. (Cl. 252—218)

This invention relates to a process for the manufacture of an active noble metal catalyst and, more particularly, to the production of a noble metal catalyst which is active in the liquid phase.

Noble metal catalysts have been prepared by sundry methods. They have been prepared in the massive, colloidal, and finely divided states. The finely divided catalysts have been prepared on an inert carrier as well as unsupported. Although these catalysts show considerable activity for laboratory purposes, they do not show sufficient activity for use in commercial hydrogenation operation.

This invention has as an object to provide a process for the production of a highly active, noble metal catalyst. Another object is to produce a new noble metal catalyst of marked activity. Still another object is to provide an improved and economical process for the production of an active, noble metal, liquid-phase catalyst which is sufficiently active for use in commercial operation. Other objects will be apparent from the reading of the following description of the invention.

These objects are accomplished by the following invention which comprises producing noble metal catalysts on a carbon catalytic support that has been heated to a temperature of at least 50° C. just prior to the use of said support in the manufacture of said catalysts.

In the production of these catalysts the carbon support is first activated by either boiling said support in an aqueous medium or by heating the dry carbon support to its ignition temperature. The support is then impregnated by a noble metal compound, followed by reduction of said compound while on the support. This may be accomplished by reducing in an aqueous slurry comprising the noble metal compound and the carbon support. The finely divided noble metal supported on the activated carbon is then filtered and washed with water.

The following examples set forth certain well defined instances of the application of this invention. They are, however, not to be considered as limitations thereof, since many modifications may be made without departing from the spirit and scope of this invention.

Example I 1,340 parts of charcoal are slurried in 8,200 parts of distilled water. The slurry is heated to boiling and is gently refluxed for 2 hours. 100 parts of palladium dichloride are dissolved in 5,500 parts of distilled water containing 40 parts of 33% hydrochloric acid. The palladium dichloride solution is added to the charcoal slurry and the mixture is agitated for 15 minutes while cooling to 85° to 90° C. Continuing the agitation, 220 parts of formalin are added. After agitating for 15 minutes, 225 parts of 50% caustic soda diluted with 450 parts of distilled water are added. The slurry is agitated and cooled to 25° to 30° C. The charge is then filtered and washed with 3,700 parts of distilled water. The catalyst is then slurried in a suitable solvent or dried in an inert atmosphere.

Example II 1,340 parts of commercial activated carbon are slurried in 8,200 parts of distilled water. The slurry is heated to boiling and is gently refluxed for 2 hours. 100 parts of palladium dichloride are dissolved in 5,500 parts of distilled water containing 40 parts of 33% hydrochloric acid. The palladium dichloride solution is added to the charcoal slurry and the mixture is agitated for 15 minutes while cooling to 85° to 90° C. Continuing the agitation, 220 parts of 85% hydrazine hydrate are added. After agitating for 15 minutes, 225 parts of 50% caustic soda diluted with 450 parts of distilled water are added. The slurry is agitated and cooled to 25° to 30° C. The charge is then filtered and washed with 3,700 parts of distilled water. The catalyst is then slurried in a suitable solvent or dried in an inert atmosphere.

Example III 380 parts of charcoal are slurried in 2,800 parts of distilled water. The slurry is heated to boiling and is gently refluxed for 2 hours. 100 parts of chlorplatinic acid (hexahydrate) are dissolved in 1,900 parts of distilled water. The platinum tetrachloride solution is added to the charcoal slurry and the mixture is agitated for 15 minutes while cooling to 85° to 90° C. Continuing the agitation, 100 parts of formalin are added. After agitating for 15 minutes, 155 parts of 50% caustic soda diluted with 300 parts of distilled water are added. The slurry is agitated and cooled to 25° to 30° C. The charge is then filtered and washed with 1,200 parts of distilled water. The catalyst is then slurried in a suitable solvent or dried in an inert atmosphere.

Example IV 730 parts of charcoal are slurried in 5,400 parts of distilled water. The slurry is heated to boiling and is gently refluxed for 2 hours. 100 parts of rhodium trichloride (trihydrate) are dissolved in 3,600 parts of distilled water containing 20 parts of 33% hydrochloric acid. The rhodium trichloride solution is added to the charcoal slurry and the mixture is agitated for 15 minutes while cooling to 85° to 90° C. Continuing the agitation, 150 parts of formalin are added. After agitating for 15 minutes, 145 parts of 50% caustic soda diluted with 290 parts of distilled water are added. The slurry is agitated and cooled to 25° to 30° C. The charge is then filtered and washed with 2,400 parts of distilled water. The catalyst is then slurried in a suitable solvent or dried in an inert atmosphere.

Example V 1,130 parts of charcoal are heated until ignition occurs. While hot, the freshly ignited charcoal is drowned in a solution of 100 parts of palladium dichloride dissolved in 5,600 parts of water containing 70 parts of 33% hydrochloric acid; 5,600 parts of water are added to this. The mixture is agitated and is kept at 90° to 100° C. while 225 parts of formalin and then 540 parts of 12½% caustic soda are added. The charge is then filtered and washed with water. The catalyst is then slurried in a suitable solvent or dried in an inert atmosphere.

Example VI 1,340 parts of charcoal are slurried in 8,200 parts distilled water. The slurry is heated for 2 hours at 50° to 60° C. 100 parts of palladium dichloride are dissolved in 5,500 parts distilled water containing 40 parts of 33% hydrochloric acid. The palladium dichloride solution is added to the charcoal slurry and agitated for 15 minutes while cooling. The resulting slurry is then treated with formalin and caustic soda, and filtered and washed as in Example I.

Example VII 1,340 parts of charcoal are slurried in 8,200 parts distilled water. The slurry is refluxed for 3 hours at 25° C. under vacuum and then treated with palladium chloride and the other constituents, as described in Example I.

The activity of each of the catalysts was determined by hydrogenating o-nitroanisole in the presence of 0.015% of its weight of palladium. This reaction was carried out by charging an iron autoclave equipped for rapid agitation with 100 parts of o-nitroanisole, 150 parts of isopropanol, 6 parts of caustic soda, and 0.015 part (based on the palladium content) of the catalyst to be tested. The charge was then hydrogenated at 55° to 60° C. and under a hydrogen pressure of from 100 to 200 lbs. per sq. in. The reaction is continued until the absorption of hydrogen becomes very slow. Using the catalyst made by heating the support to the reflux temperature in accordance with Example I, above, the hydrogenation reaction was completed in 6 hours. Similar results were obtained with each of the catalysts prepared in accordance with Examples II, III, IV, and V. Using the catalyst prepared by Example VI, the hydrogenation was only about 75% complete in about 8½ hours while with the catalyst prepared by Example VII less than 5% of the theoretical amount of hydrogen was absorbed in 2 hours.

This invention is not limited to the particular conditions cited in the above examples. The proportion of support to noble metal is preferably from 5 to 30 times the weight of noble metal, but may be varied from 50% to 200 times the weight of noble metal and upward. In Examples I and II, for instances, the proportion is about 22:1, while in Example III it is about 10:1.

The length of time necessary for heating the charcoal is relatively unimportant. Active catalysts have been made in which the charcoal has been heated for less than half an hour while others have been heated for over 10 hours. The temperature obtained in the heating should be from 50° C. to the ignition point of the charcoal, or higher if protected by an inert atmosphere.

It is preferable that an aqueous slurry be refluxed under atmospheric pressure. Heating the charcoal prior to precipitation of the noble metal results in a much more active noble metal, liquid-phase catalyst than any disclosed in the literature. Heating the carbon after the catalyst has been deposited on it does not produce nearly so active a catalyst as the exceedingly active one prepared according to the present invention.

Alkaline formaldehyde is the preferable reducing agent; however, other organic or inorganic reducing agents which are capable of reducing the particular noble metal compounds and which do not poison the catalyst may be used. Among these are hydrazine, alkaline formates, formaldehydes and hydrogen, etc.

The catalytic metal may be palladium, platinum, or rhodium. Any soluble compound of these noble metals may be used as the basic material for preparing the catalyst, but the chlorides are preferable. The noble metals may be used separately or may be combined, either before or after reduction.

The volumes of water may be varied widely. Washing the catalyst relatively free of salts is desirable but not absolutely necessary.

The catalyst need not be slurried in a solvent or dried. It may be used after reduction without filtering off the mother liquors, or the filter cake may be used directly, although it is preferable and more convenient to slurry the filter cake in a solvent suitable for use in the reaction to be catalyzed. If it is dried, it is preferable that this be done in an inert atmosphere to prevent damaging the catalytic surface.

The type of charcoal used for the support is preferably a high grade, neutral, activated carbon of fine mesh made from residual organic material incidental to the cellulose industry. Although this charcoal is known as an activated carbon, further treatment by heating, as previously described, is necessary in order to produce the exceedingly active catalyst of this invention. Many other types of charcoal may be used. It may be of vegetable, mineral, or animal origin obtained from lignin, peat, various woods, coconut shells, blood, sugar, rice hulls, and the like.

The catalyst produced by heating the carbonaceous support according to this invention has remarkable activity even in strongly alkaline media. Heretofore, the use of liquid-phase, noble metal catalysts has been impractical on a commercial scale because of their high cost. The catalyst produced according to this invention is so active that it can be used in commercial operations as only exceedingly small quantities are required. For example, very small amounts can be used to produce benzidine, tolidine, and dianisidine commercially by the hydrogenation of their nitro bodies in strongly alkaline media. Details for the commercial production of the above diamines, using the catalysts in this invention, are disclosed in U. S. applications Serial Nos. 303,474, 303,476, and 303,477, filed on even date herewith and issued on February 25, 1941, as U. S. Patents Nos. 2,233,128, 2,233,129 and 2,233,130, respectively.

It is apparent that many widely different embodiments of this invention may be made without departing from the spirit and scope thereof and therefore it is not intended to be limited except as indicated in the appended claims.

We claim:

1. A noble metal catalyst on a carbon support of vegetable origin, which noble metal is selected from the group consisting of platinum, palladium, and rhodium, which comprises in its method of preparation the step of heating said carbon support to a temperature of at least 50° C. just prior to impregnating same with a noble metal compound, said preparation being further characterized in that the impregnation of the noble metal takes place at a temperature in excess of 50° C. and the temperature of the support is not permitted to fall below the initial preheating temperature until after the impregnation of the noble metal compound takes place.

2. A noble metal catalyst supported on commercial active carbon, said noble metal being selected from the group consisting of platinum, palladium and rhodium, which comprises in its method of preparation the step of heating the carbon support to a temperature of at least 50° C. just prior to impregnating same with the said noble metal, said preparation being further characterized in that the impregnation of the noble metal takes place at a temperature in excess of 50° C. and the temperature of the support is not permitted to fall below the initial preheating temperature until after the impregnation of the noble metal compound takes place.

3. The catalyst of claim 2 characterized in that the carbon support is of vegetable origin.

4. A noble metal catalyst on a carbon support, said noble metal being selected from the group consisting of platinum, palladium, and rhodium, which comprises in its method of preparation the step of heating said carbon support in an aqueous slurry, under reflux conditions, at atmospheric pressure just prior to impregnating said support with said noble metal, the method of preparation being further characterized in that the temperature of said support is not permitted to drop below 50° C. between the refluxing step and the impregnation step.

5. The catalyst of claim 4 characterized in that the carbon support is a neutral, activated carbon of fine mesh derived from residual organic material incidental to the cellulose industry.

6. In the process of producing highly active, noble metal catalysts supported on carbon, said noble metal being selected from the group consisting of platinum, palladium, and rhodium, the improvement which comprises heating the carbon support just prior to impregnating same with said noble metal to a temperature of at least 50° C. and not permitting the temperature of said support to fall below 50° C. until the support is impregnated with said noble metal.

7. A noble metal catalyst supported on active carbon, said noble metal being selected from the group consisting of platinum, palladium and rhodium, which comprises in its method of preparation the process of heating the active carbon support to a temperature of at least 50° C. in an inert medium and then impregnating said support with a compound of said noble metal while maintaining said temperature above 50° C.

8. A noble metal catalyst supported on active carbon, said noble metal being selected from the group consisting of platinum, palladium and rhodium, which comprises in its method of preparation the process of boiling the active carbon in water under reflux at atmospheric pressure, then impregnating said active carbon with the noble metal while maintaining a temperature of at least 50° C.

9. The process for the preparation of a noble metal catalyst which comprises heating an active carbon support to a temperature of at least 50° C. in an inert medium, then, while maintaining said temperature in excess of 50° C., impregnating said support with a compound of a noble metal selected from the group consisting of platinum, palladium and rhodium.

10. The process in accordance with claim 9 characterized in that the inert medium is water.

11. The process for the preparation of a noble metal catalyst which comprises heating an active carbon support in water to a boiling temperature under reflux conditions at atmospheric pressure, then, while maintaining the temperature of the support in excess of 50° C., impregnating said active carbon with a noble metal selected from the group consisting of platinum, palladium and rhodium.

12. The process for the preparation of a noble metal catalyst which comprises heating an active carbon support in water to a temperature in excess of 50° C., adding a water soluble salt of a noble metal selected from the group consisting of platinum, palladium and rhodium, and impregnating said carbon support with said noble metal by precipitating same thereon.

CLYDE O. HENKE.
ROLAND G. BENNER.
ROBERT C. W. JONES.